US012649328B2

(12) United States Patent
Yamamoto et al.

(10) Patent No.: US 12,649,328 B2
(45) Date of Patent: Jun. 9, 2026

(54) IMAGE FORMING APPARATUS

(71) Applicant: FUJIFILM CORPORATION, Minato-ku (JP)

(72) Inventors: Masahiko Yamamoto, Kanagawa (JP); Hidetoshi Kimura, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 167 days.

(21) Appl. No.: 18/580,622

(22) PCT Filed: Aug. 5, 2022

(86) PCT No.: PCT/JP2022/030100
§ 371 (c)(1),
(2) Date: Jan. 19, 2024

(87) PCT Pub. No.: WO2023/026821
PCT Pub. Date: Mar. 2, 2023

(65) Prior Publication Data
US 2024/0316969 A1 Sep. 26, 2024

(30) Foreign Application Priority Data
Aug. 25, 2021 (JP) ................................ 2021-137571

(51) Int. Cl.
*B41J 2/01* (2006.01)
*B41J 29/13* (2006.01)

(52) U.S. Cl.
CPC ................ *B41J 29/13* (2013.01); *B41J 2/01* (2013.01)

(58) Field of Classification Search
CPC ............. B41J 2/01; B41J 29/00; B41J 29/13; H04N 1/00384; G03G 21/16
See application file for complete search history.

(56) References Cited

U.S. PATENT DOCUMENTS 4,959,684 A 9/1990 Ito
2006/0133840 A1* 6/2006 Yoshida ............ G03G 15/5016 399/81
2009/0316186 A1* 12/2009 Higashi .................. G06F 21/35 726/20
2013/0286418 A1* 10/2013 Suzuki .............. H04N 1/00384 358/1.14
2015/0040785 A1 2/2015 Turke et al.
2015/0366058 A1 12/2015 Hando et al.
2021/0168246 A1* 6/2021 Kamei .............. H04N 1/00559
2023/0234367 A1 7/2023 Chen et al.

FOREIGN PATENT DOCUMENTS

CN 205736451 * 11/2016 ............... B41J 3/60
CN 112874169 A 6/2021
JP H01-176860 U 12/1989
JP H01-307780 A 12/1989
(Continued)

*Primary Examiner* — Anh T Vo
(74) *Attorney, Agent, or Firm* — SOLARIS Intellectual Property Group, PLLC

(57) ABSTRACT

An apparatus includes a housing in which a band-shaped portion extending over a side surface and a front surface of the apparatus is formed, and a push button disposed within a range of the band-shaped portion on the side surface, the push button protruding from the band-shaped portion in a pressing direction.

15 Claims, 7 Drawing Sheets

(56) References Cited

FOREIGN PATENT DOCUMENTS

| | | | |
|---|---|---|---|
| JP | H10-301178 | A | 11/1998 |
| JP | 2005-338333 | A | 12/2005 |
| JP | 2008-059768 | A | 3/2008 |
| JP | 2011-186234 | A | 9/2011 |
| JP | 1533194 | S | 9/2015 |
| JP | 2016-021551 | A | 2/2016 |
| JP | 2017-074783 | A | 4/2017 |
| JP | 2017-092518 | A | 5/2017 |
| JP | 2020-008699 | A | 1/2020 |
| JP | 1660831 | S | 6/2020 |

* cited by examiner

IMAGE FORMING APPARATUS

TECHNICAL FIELD

The present disclosure relates to an apparatus.

BACKGROUND ART

Japanese Patent Application Laid-Open (JP-A) No. 2005-338333 A discloses an image forming apparatus including a drive load, a DC power supply that supplies power to the drive load, an emergency stop unit that operates by a pushing operation, and a stop unit that detects operation of the emergency stop unit and stops the drive load, in which the emergency stop unit includes an emergency stop button provided at any of corners on an apparatus exterior, including a corner where an upper surface exterior portion and a left side surface exterior portion are in contact with each other, a corner where the upper surface exterior portion and a right side surface exterior portion are in contact with each other, a corner where the upper surface exterior portion and a front surface exterior portion are in contact with each other, a corner where the left side surface exterior portion and the front surface exterior portion are in contact with each other, and a corner where the right side surface exterior portion and the front surface exterior portion are in contact with each other.

SUMMARY OF INVENTION

Technical Problem

In the configuration in which the push button is provided at the corner between the front surface and the side surface, there is a possibility that the operator unexpectedly presses the push button when moving.

An object of the present disclosure is to suppress an erroneous operation of a push button as compared with a case in which the push button is disposed at a corner of an apparatus.

Solution to Problem

An apparatus according to a first aspect includes: a housing in which a band-shaped portion extending over a side surface and a front surface of the apparatus is formed; and a push button disposed within a range of the band-shaped portion on the side surface, the push button protruding in a pressing direction from the band-shaped portion.

An apparatus according to a second aspect is the apparatus according to the first aspect, in which the band-shaped portion is a groove recessed with respect to the side surface and the front surface of the housing, and the push button protrudes from a bottom of the groove in the pressing direction.

An apparatus according to a third aspect is the apparatus according to the first or second aspect, in which the band-shaped portion has a terminal end at a portion on a side surface side of the front surface.

An apparatus according to a fourth aspect is the apparatus according to the third aspect, in which one edge among upper and lower edges of the terminal end of the band-shaped portion extends horizontally on the front surface and is connected to a boundary line which is a boundary between a plurality of surfaces, and another edge of the upper and lower edges of the terminal end of the band-shaped portion abuts on another boundary line, which is a boundary between a plurality of surfaces and extends vertically on the front surface.

An apparatus according to a fifth aspect is the apparatus according to any one of the first to fourth aspects, in which the band-shaped portion has a base end at a portion on a front surface side of the side surface.

An apparatus according to a sixth aspect is the apparatus according to any one of the first to fifth aspects, in which the push button is a stop button that is pressed to stop the apparatus.

An apparatus according to a seventh aspect is the apparatus according to the sixth aspect, further including another push button that has a function different from the stop button and is disposed within a range of the band-shaped portion, in which the stop button is disposed closer to the front surface side than the other push buttons.

An apparatus according to an eighth aspect is the apparatus according to the seventh aspect, in which the other push button is disposed to be recessed in a pressing direction with respect to the band-shaped portion.

An apparatus according to a ninth aspect is the apparatus according to the seventh or eighth aspect, further including: a first recess that is provided in the band-shaped portion and in which the stop button is accommodated; and a second recess provided in the band-shaped portion, the second recess accommodating the other push button, the second recess having a gap between an edge and the other button smaller than a gap between the stop button and an edge of the first recess.

An apparatus according to a tenth aspect is the apparatus according to any one of the seventh to ninth aspects, in which the other push button is a reset button that is pressed to return the apparatus stopped by the stop button to an operable state.

An apparatus according to an eleventh aspect is the apparatus according to any one of the sixth to tenth aspects, in which the stop button is within a range of from 120 mm to 250 mm from the front surface.

An apparatus of a twelfth aspect is the apparatus according to any one of the first to eleventh aspects, in which a vertical width of the band-shaped portion is from 80 mm to 180 mm.

An apparatus according to a thirteenth aspect is the apparatus according to any one of the first to twelfth aspects, in which a vertical center of the band-shaped portion has a height of from 800 mm to 1100 mm from an installation surface of the apparatus.

An apparatus according to a fourteenth aspect is the apparatus according to any one of the first to thirteenth aspects, in which a base end of the band-shaped portion is within a range of 400 mm or less from the front surface.

An apparatus according to a fifteenth aspect is the apparatus according to any one of the first to fourteenth aspects, in which the housing has an upper surface connected to the side surface and the front surface, and the upper surface constitutes a working portion of an operator.

An apparatus according to a sixteenth aspect is the apparatus according to the fifteenth aspect, in which a discharge portion through which a discharge object is discharged from another housing disposed adjacent to the housing is provided above the upper surface, the discharge portion is accessible from the side surface, and the band-shaped portion is disposed to be shifted toward the front surface side with respect to the discharge portion in a side view.

An apparatus according to a seventeenth aspect is the apparatus according to the sixteenth aspect, in which the other housing includes a forming unit that forms an image on a recording medium, and the discharge portion discharges a medium on which an image is formed in the other housing.

Advantageous Effects of Invention

According to the apparatus of the first aspect, it is possible to suppress an erroneous operation of the push button as compared with the case in which the push button is disposed at the corner of the apparatus.

According to the apparatus of the second aspect, it is possible to suppress an erroneous operation of the push button as compared with a case in which the band-shaped portion is flush with the side surface and the front surface.

According to the apparatus of the third aspect, it is possible to suppress an erroneous operation of the push button as compared with the case in which the terminal end of the band-shaped portion reaches the side opposite to the side surface on the front surface.

According to the apparatus of the fourth aspect, it is possible to suppress an erroneous operation of the push button as compared with the case in which both the upper and lower edges are connected to the boundary line extending in the horizontal direction.

According to the apparatus of the fifth aspect, when the operator views the apparatus from the side, it is possible to suppress an erroneous operation of the push button as compared with the case in which the base end of the band-shaped portion is on the back surface side.

According to the apparatus of the sixth aspect, it is possible to suppress an erroneous operation of the stop button as compared with a case in which the stop button for stopping the apparatus is arranged at the corner of the apparatus.

According to the apparatus of the seventh aspect, it is possible to suppress an erroneous operation of the stop button as compared with a case in which another push button is disposed on the front surface side of the stop button.

According to the apparatus of the eighth aspect, it is possible to suppress an erroneous operation between the stop button and the other push button as compared with a case in which the other push button protrudes from the band-shaped portion in the pressing direction.

According to the apparatus of the ninth aspect, as compared with the case in which the gap between the other push button and the edge of the second recess is larger than the gap between the stop button and the edge of the first recess, it is possible to suppress an erroneous operation between the stop button and the other push button provided in the first recess and the band-shaped portion.

According to the apparatus of the tenth aspect, the apparatus stopped by the stop button can be made operable.

According to the apparatus of the eleventh aspect, the erroneous operation of the stop button can be suppressed as compared with the case in which the stop button is outside the range of from 120 mm to 250 mm from the front surface.

According to the apparatus of the twelfth aspect, it is possible to suppress an erroneous operation of the push button as compared with the case in which the vertical width of the band-shaped portion is out of the range of from 80 mm to 180 mm.

According to the apparatus of the thirteenth aspect, it is possible to suppress an erroneous operation of the push button as compared with the case in which the center of the band-shaped portion in the up-down direction is outside the range where the height from the installation surface of the apparatus is from 800 mm to 1100 mm.

According to the apparatus of the fourteenth aspect, it is possible to suppress an erroneous operation of the push button as compared with the case in which the base end of the band-shaped portion is out of the range of 400 mm or less from the front surface.

According to the apparatus of the fifteenth aspect, in a subsequent generation in which the push button is provided in the housing whose upper surface constitutes the working portion, it is possible to suppress an erroneous operation of the push button as compared with a case in which the push button is disposed at the corner of the apparatus.

According to the apparatus of the sixteenth aspect, it is possible to suppress an erroneous operation of the push button as compared with the case in which the band-shaped portion extends below the discharge portion in the side view.

According to the apparatus of the seventeenth aspect, in the configuration in which the medium on which the image is formed is discharged as the discharge object, the erroneous operation of the push button can be suppressed as compared with the case in which the band-shaped portion extends to the lower side of the discharge portion in the side view.

DESCRIPTION OF EMBODIMENTS

Figure 1:
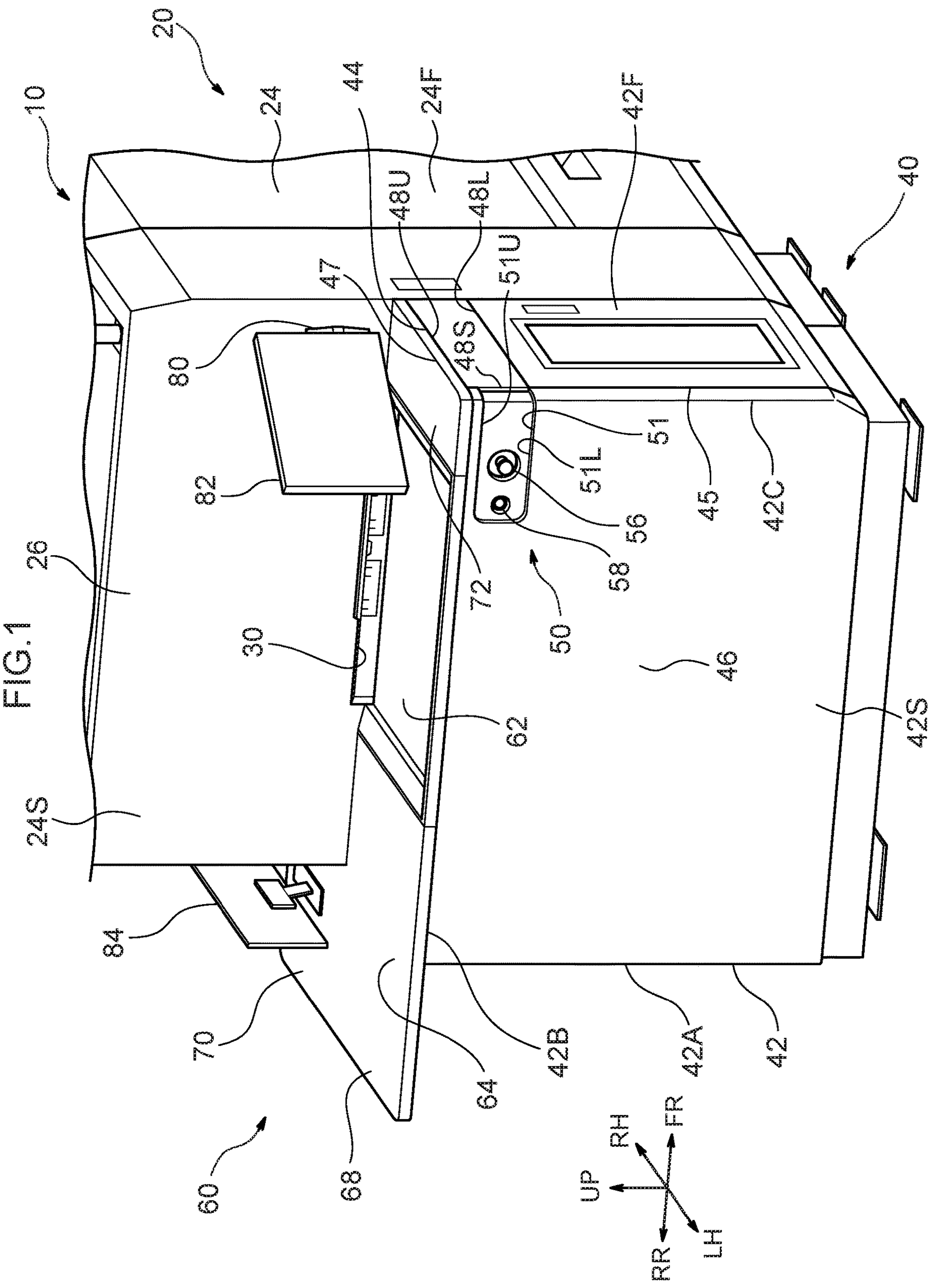
FIG. 1 is a perspective view illustrating a part of an apparatus according to an embodiment of the present disclosure.

Hereinafter, an example of an embodiment of the present disclosure will be described with reference to the drawings. In the drawings, the same or equivalent components and components are denoted by the same reference numerals. In addition, dimensional ratios in the drawings are exaggerated for convenience of description, and may be different from actual ratios.

In addition, an arrow UP illustrated in each drawing indicates the vertical direction and the apparatus upward direction, an arrow LH indicates the horizontal direction and the apparatus width direction leftward direction, an arrow RH indicates the horizontal direction and the apparatus width direction rightward direction, an arrow FR indicates the horizontal direction and the apparatus frontward direction, and an arrow RR indicates the horizontal direction and the apparatus rearward direction (depth direction).

In the following description, "up-down direction" may be used to mean "both the upward direction and the downward direction" or "one of the upward direction and the downward direction". The "left-right direction" may be used to mean "both the rightward direction and the leftward direction" or "one of the rightward direction and the leftward direction". The "left-right direction" can also be referred to as a lateral direction or a horizontal direction. The "front-rear direction" may mean "both the frontward direction and the rearward direction" or "one of the frontward direction and the rearward direction". The "front-rear direction" can also be referred to as a lateral direction or a horizontal direction. The up-down direction, the left-right direction, and the front-rear direction are directions (specifically, orthogonal directions) crossing each other.

The apparatus 10 according to the description of the disclosure is, for example, an inkjet type image forming apparatus that forms an image by attaching ink to a sheet-like recording medium P.

In the present description, a surface of the apparatus 10 facing the frontward direction is referred to as a "front surface" in the disclosure, and a surface of the apparatus 10 facing the rearward direction is referred to as a "back surface" in the disclosure.

(Overall Configuration)

Figure 2:
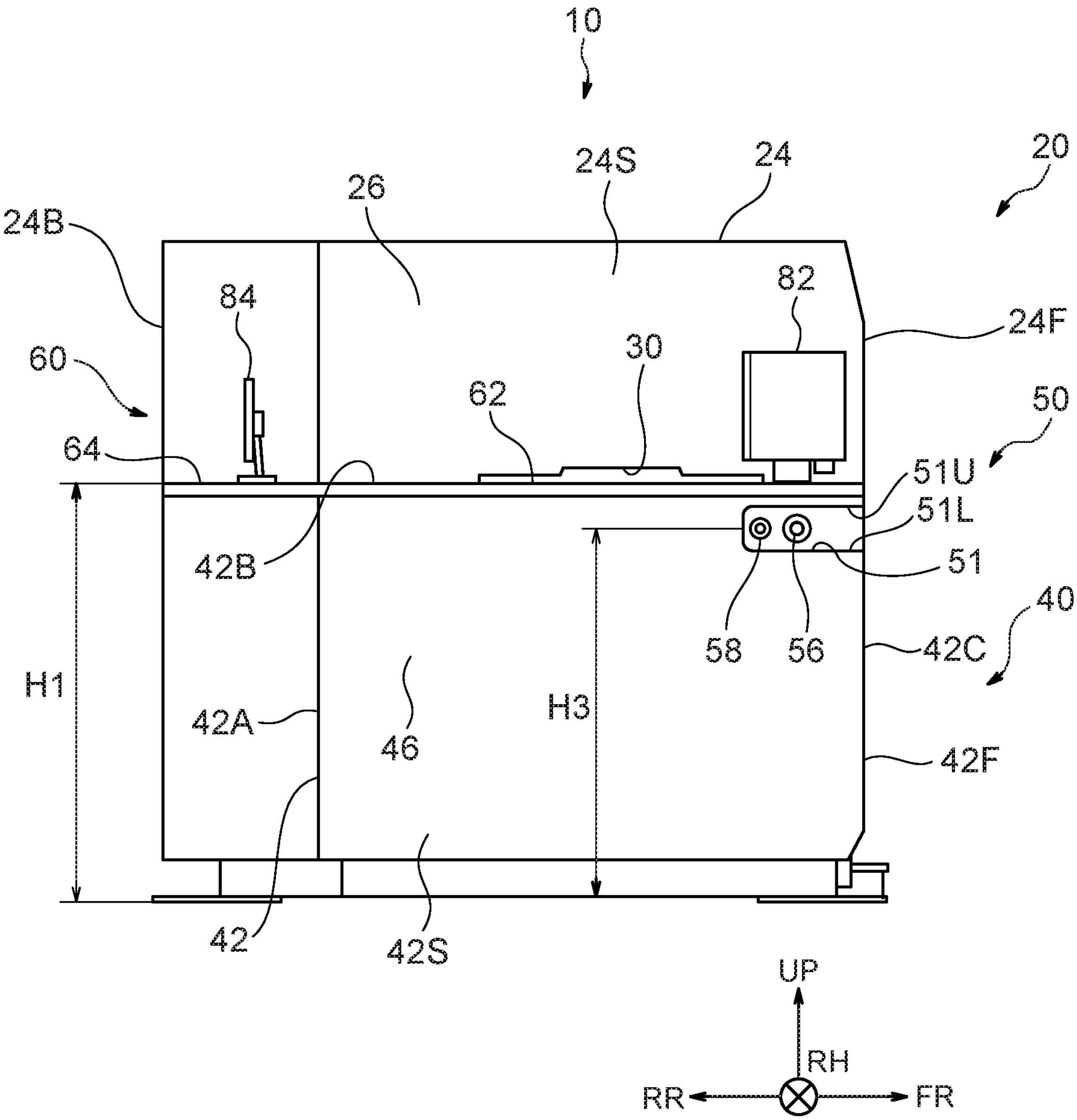
FIG. 2 is a side view of an apparatus according to an embodiment of the disclosure.

As illustrated in FIGS. 1 and 2, the apparatus 10 according to the disclosure includes, as an example, a first body 20 that forms an image on a recording medium P, and a second body 40 disposed on a left side of the first body 20. Further, the apparatus 10 includes a display operation unit 82 and an emergency stop operation unit 50.

(First Body 20)

As illustrated in FIGS. 1 and 2, the first body 20 includes a first housing 24 that accommodates various apparatuses including an image forming unit that forms an image on a sheet-like recording medium P. The first housing 24 includes a housing body 24A formed in a rectangular parallelepiped shape and a projecting portion 24B having a rectangular parallelepiped shape projecting rearward from a right side portion of the housing body 24A, and has an L shape in plan view.

On the front surface of the first housing 24, that is, the first body 20, a cover that opens and closes at the time of internal maintenance, a pull-out tray that stores a recording medium, and a cover that opens and closes at the time of removing a paper jam of paper are disposed. That is, the front surface of the first body 20 is a surface on which an operator has the highest access frequency in the apparatus 10.

A discharge port 30 is formed in the left side surface 24S of the first housing 24. The discharge port 30 is a portion where the recording medium P on which an image is formed is discharged from the first housing 24 in the first body 20. The discharge port 30 is formed in a slit shape long in the front-rear direction at an intermediate portion in the up-down direction on the left side surface 24S, and discharges the recording medium P in an attitude in which the thickness direction thereof corresponds to the up-down direction. The discharge port 30 is an example of a discharge portion. Furthermore, the recording medium P on which an image is formed is an example of a discharge object.

Of the walls forming the left side surface 24S of the first housing 24, a wall forming a portion above the lower edge (in other words, the upper surface of the second housing 42) of the discharge port 30 is referred to as a standing wall 26.

The housing body 24A of the first housing 24 accommodates an image forming unit that forms an image on the sheet-like recording medium P, a sheet feeding unit that supplies the recording medium to the image forming unit, a conveyance unit, and the like. A power supply board, a control board, and the like are accommodated in the projecting portion 24B.

In the first body 20 described above, each unit is controlled by the control unit mounted on the control board, an image is formed on the recording medium P, and the recording medium P on which the image is formed is discharged from the discharge port 30.

(Second Body 40)

As illustrated in FIGS. 1 and 2, the second body 40 is disposed adjacent to the left side of the first body 20. The second body 40 includes a second housing 42. The second housing 42 includes a rectangular parallelepiped housing body 42A having a height lower than that of the first housing 24, and a table portion 42B forming a part of a working portion 60 described later.

A carriage is built in the housing body 42A, and the recording medium P on which an image is formed is discharged. The height of the second housing 42 is equal to the height to the portion where the discharge port 30 is formed in the first housing. In addition, the front-rear length (that is, the depth dimension) of the housing body 42A in the second housing 42 is equivalent to the depth dimension of the left side surface 24S of the first housing 24, and the lateral width of the second housing is slightly larger than the dimension along the discharge direction of the recording medium P having the maximum size capable of forming an image in the first body 20.

A front upper portion of the second housing 42 is provided with a fixed cover 44. The fixed cover 44 has a rectangular shape in a front view of the second body 40. An opening/closing cover 45 is provided below the fixed cover 44 on the front surface of the second housing 42. The opening/closing cover 45 is a portion that is opened and closed when the recording medium P discharged into the housing body 42A is taken out, and has a rectangular shape in a front view of the second body 40.

On the front surface of the second housing 42, a parting line is formed between the fixed cover 44 and the opening/closing cover 45. Among them, a boundary portion along the horizontal direction between the upper edge of the fixed cover 44 and the lower edge of the top panel 47 extending from the top tray 62 to be described later to the front surface 24F is referred to as a parting line 48U. Further, a boundary portion along the horizontal direction between the lower edge of the fixed cover 44 and the upper edge of the opening/closing cover 45 is referred to as a parting line 48L. A boundary portion along the up-down direction between the left edge of the fixed cover 44 and a corner portion 42C extending from the left side surface 42S to the front surface 42F is referred to as a parting line 48S. The parting lines 48L and 48S are examples of boundary lines. Here, the boundary line refers to a line formed between surfaces, and is not limited to a parting line, and may be a line forming a step portion in a case in which there is a step between surfaces.

A corner portion 42C between the front surface and the side surface of the second housing 42 is rounded, for example. In the second housing 42, no covers are provided on the left side surface 42S.

The height H1 of the upper surface of the second body 40 is desirably from 1000 mm to 1200 mm. In the present embodiment, as an example, the height H1 is 1000 mm from the installation surface of the apparatus 10. The second housing 42 having the height H1, that is, the upper portion of the second body 40 serves as a working portion 60. That is, the second body 40 has an upper surface connected to the left side surface 42S and the front surface 42F, and the upper surface serves as the working portion 60.

(Working Portion 60)

The working portion 60 includes, on the upper surface of the second housing 42, a top tray 62 formed below the discharge port 30 of the first body 20 in the left side view, a side table 64 adjacent to the rear of the top tray 62, and a front table 72 adjacent to the front of the top tray 62. The top tray 62 is an example of a placement portion, and the side table 64 and the front table 72 are examples of other placement portions.

The top tray 62 is a portion on which the recording medium P discharged from the discharge port 30 is placed, and in the present embodiment, a predetermined number of recording media P are stacked. That is, the placement surface, which is the upper surface of the top tray 62, is disposed below the nip portion of the discharge roll pair (not illustrated) exposed from the discharge port 30.

A placement surface of the top tray 62 has a rectangular shape in plan view, and a recording medium P having a maximum size on which an image can be formed by the first body 20 is placed without protruding in plan view.

The side table 64 has a rectangular shape in plan view, and is formed in a rectangular shape in plan view by a rear side portion of the top tray on the upper surface of the housing body 42A and an overhang portion 68 overhanging rearward from the housing body 42A. The side table 64 is configured such that the recording medium P having the maximum size on which an image can be formed by the first body 20 is placed without protruding in plan view.

The side table 64 has a rectangular protruding portion 70 protruding rightward from the right edge of the overhang portion 68. The front edge of the protruding portion 70 is in contact with the back surface of the left side portion of the first housing 24 or faces the back surface with a slight gap interposed therebetween.

The side table 64, that is, the rear edges of the overhang portion 68 and the protruding portion 70 substantially coincide with the rear edge of the projecting portion 24B in the left side view. That is, the overhang portion 68 and the protruding portion 70 do not protrude rearward from the rear edge of the first housing 24. The protruding portion 70 has a size on which another display operation unit 84 such as a print server or a laptop computer can be placed.

A portion of the side table 64 excluding the protruding portion 70 can also be regarded as an example of another placement portion.

The front table 72 is configured as a rectangular portion on the front side of the top tray 62 on the upper surface of the housing body 42A. Input apparatuses such as a mouse and a keyboard to be input to a display operation unit 82 described later can be placed on the front table 72.

The working portion 60 described above is used for various works of the operator M. Specifically, the top tray 62 and the side table 64 are mainly used for work from the left side surface by the operator M who accesses from the left side. Examples of the work include confirmation and comparison of the recording medium P discharged from the discharge port 30.

The protruding portion 70 of the side table 64 is mainly used for work from the back surface. Examples of the work include apparatus setting using an external apparatus such as a print server or a notebook personal computer. The front table 72 is mainly used for work from the front surface.

(Display Operation Unit 82)

Next, the display operation unit 82 included in the apparatus 10 of the disclosure will be described.

The display operation unit 82 is, for example, a substantially rectangular touch panel type user interface, and is disposed above the second body 40.

The display operation unit 82 has a function of displaying information on the apparatus 10 to the operator M. The display operation unit 82 has a function of receiving an input operation from the operator M. For example, the display operation unit 82 is operated by the operator M when the operator M causes the apparatus 10 to execute processing of forming an image, thereby transmitting a signal for executing processing of forming an image on the recording medium P to the control unit.

Note that the signal to be transmitted includes, for example, in addition to image data of an image to be formed on the recording medium P, various setting values to be referred to when image forming processing is performed, such as a type of sheet to be used as the recording medium P, a conveyance speed of the recording medium P, and a color to be formed on the recording medium P.

In addition, the display operation unit 82 has a function of displaying trouble information such as various setting values and paper clogging referred to when the above-described image forming processing is performed, in addition to the image to be formed on the recording medium P.

That is, the operator M can confirm the above-described various setting values displayed on the display operation unit 82 when performing an operation of forming an image on the recording medium P.

As illustrated in FIGS. 1 and 2, the display operation unit 82 is supported above the second body 40 by the standing wall 26 of the first housing 24 or the coupling portion 80 connected to a frame member (not illustrated) covered by the standing wall 26.

The coupling portion 80 is, for example, a plurality of shafts extending in the up-down direction and a plurality of arms that are hollow members and are connected to the respective shafts, and the arms rotate about the respective shafts, so that the display operation unit 82 can be directed in the frontward direction, the leftward direction, and the rearward direction.

When the standing wall 26 is viewed from the side, the coupling portion 80 is connected to the front surface 24F side of the first body 20 from the center of the left side surface 24S. That is, the coupling portion 80 supports the display operation unit 82 at a position where the operator M standing in front of the second body 40 can easily operate the display operation unit.

Note that the display operation unit 82 may be connected to and communicate with the first body 20 in any way, but is connected to the first body 20 by using a cable as an example, and the cable is stored and supported inside the arm.

The coupling portion 80 can switch the attitude of the display operation unit 82 to an attitude facing forward on the left side of the standing wall 26, an attitude facing leftward above the front portion (here, the right side as viewed from the operator M standing on the side surface side) of the working portion 60, and an attitude facing rearward on the left side (here, the right side as viewed from the operator M standing on the back surface side) of the standing wall 26.

(Emergency Stop Operation Unit 50)

Here, the second housing 42 is provided with an emergency stop operation unit 50. The emergency stop operation unit 50 includes a groove 51, an emergency stop button 56 which is an example of a push button and a stop button, and a reset button 58 which is an example of another push button. The groove 51 is an example of a band-shaped portion.

Here, the band-shaped portion refers to a band-shaped portion that can be visually or tactilely distinguished from a portion other than the band-shaped portion by the operator M on the surface of the housing. The groove 51 is configured as a portion that can be visually and tactilely distinguished from the general surface 46 by the operator M by forming a step serving as a groove wall between the side surface 42S of the housing body 42A and the general surface 46.

Figure 3:
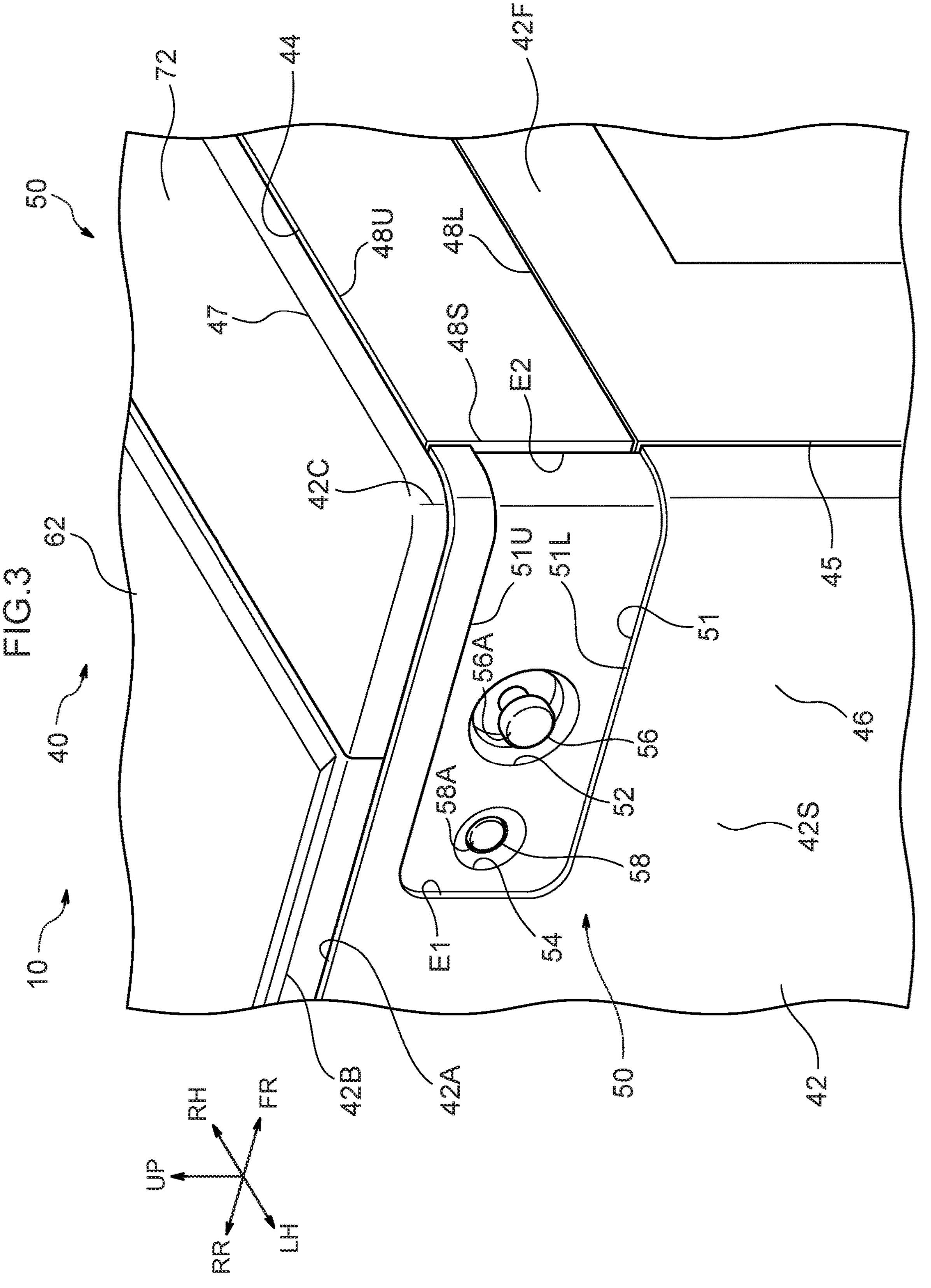
FIG. 3 is an enlarged perspective view illustrating an emergency stop operation unit according to an embodiment of the disclosure.
Figure 4A:
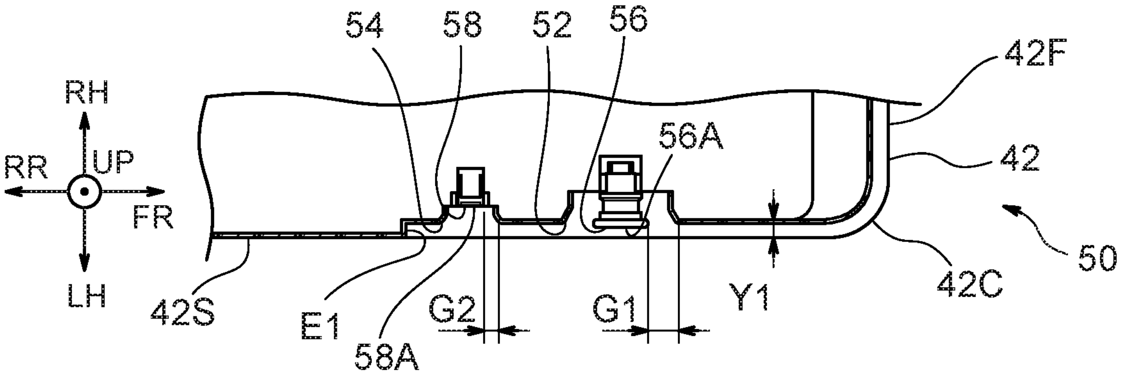
FIG. 4A is an enlarged view illustrating an emergency stop operation unit according to an embodiment of the disclosure, and is a plan cross-sectional view taken along line 4A-4A in FIG. 4B.
Figure 4B:
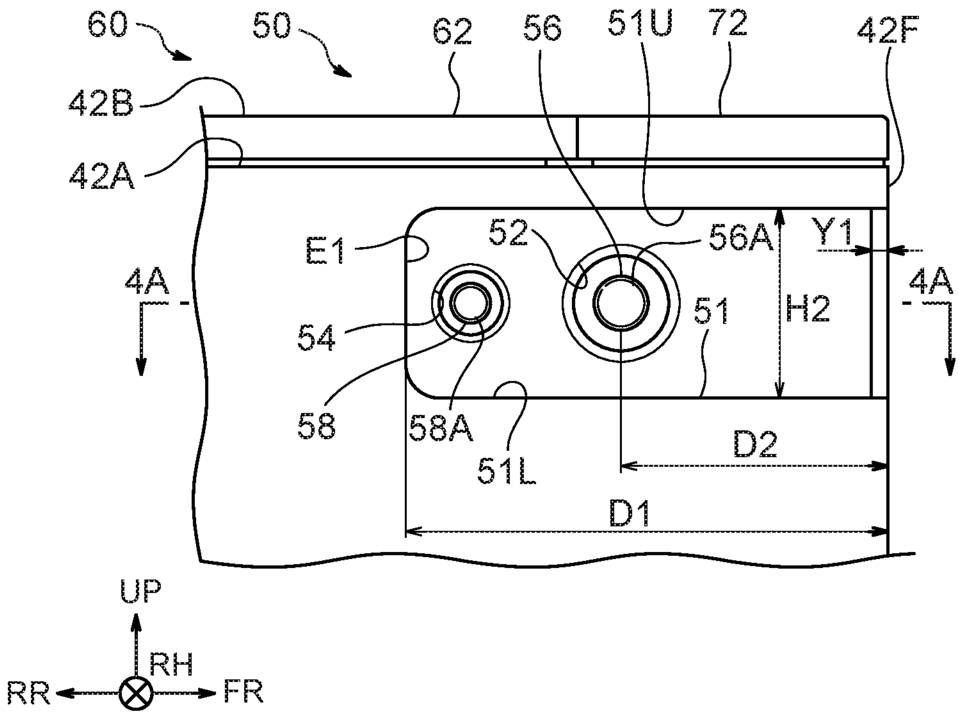
FIG. 4B is an enlarged side view illustrating the emergency stop operation unit according to the embodiment of the disclosure.
Figure 4C:
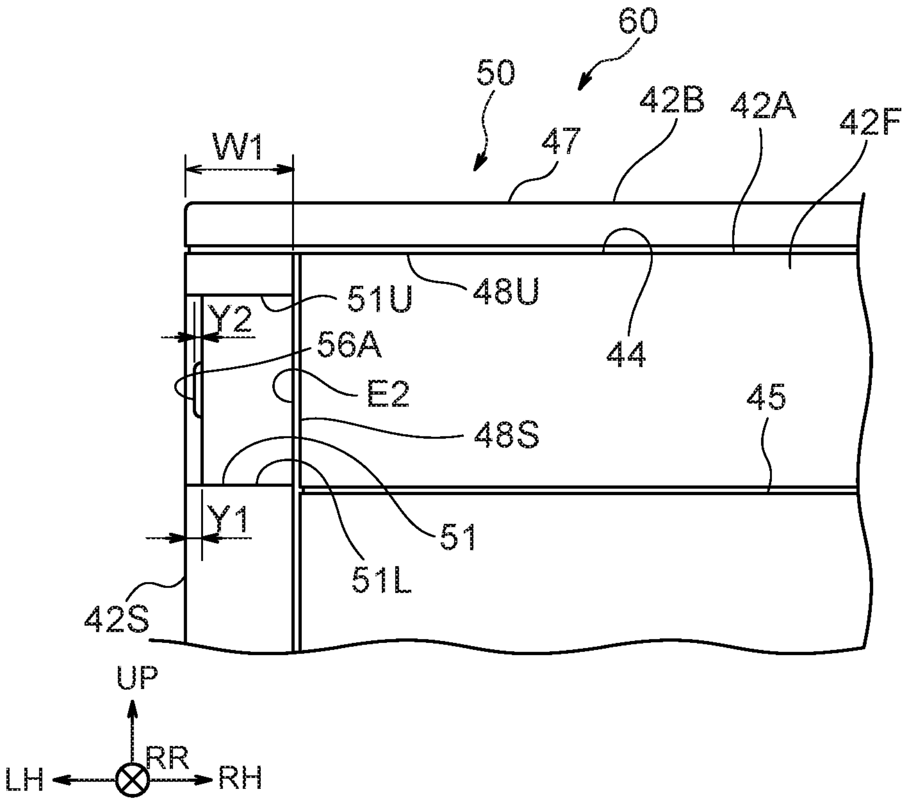
FIG. 4C is an enlarged front view illustrating the emergency stop operation unit according to the embodiment of the disclosure.

FIG. 3 is an enlarged perspective view illustrating the emergency stop operation unit 50, FIG. 4A is an enlarged view illustrating the emergency stop operation unit, and is a plane cross-sectional view taken along line 4A-4A in FIG. 4B, FIG. 4B is a side view, and FIG. 4C is a front view. As shown in FIG. 3 and FIGS. 4A to 4C, the groove 51 is a portion that extends forward along the front-rear direction that is the horizontal direction from the base end E1 extending in the up-down direction when the second housing 42 is viewed from the side, and is recessed with respect to the general surface 46 (that is, the widest surface continuous without a step) on the side surface 42S of the housing body 42A.

The groove 51 extends from the side surface 42S to the front surface 42F via the corner portion 42C. That is, the groove 51 extends across the left side surface 24S and the front surface 24F. In the present embodiment, the groove 51 extends from the portion of the left side surface 24S on the front surface 42F side to the edge of the corner portion 42C on the front surface side. Note that the band-shaped portion extending over the side surface and the front surface means that the surface of the band-shaped portion can be visually recognized (has an area when projected in each direction) in both the side view and the front view, and in the case of the groove 51, the bottom surface can be visually recognized in both the side view and the front view.

When the second housing 42 is viewed from the front, the groove 51 extends rightward from the side surface 42S side and abuts on a parting line 48S of the fixed cover 44 extending in the up-down direction to form a terminal end E2. An upper end 51U of the groove 51 abuts on a parting line 48S of the fixed cover 44 extending in the up-down direction of the fixed cover 44, and a lower end 51L of the groove 51 is connected to a parting line 48L extending horizontally of the fixed cover 44.

That is, the groove 51 has a rectangular shape in a side view and a front view, and is formed in a substantially L shape when the bottom of the groove 51 is viewed in a cross section along the horizontal direction.

Here, the bottom surface of the groove 51 is a surface recessed from the general surface 46 and extending along the general surface 46, and is the widest surface within the range of the groove 51 in the present embodiment which is a shallow groove.

The base end E1 of the groove 51 is located on the front surface 42F side of the housing body 42A with respect to the center of the side surface 42S. That is, the base end E1 of the groove 51 is disposed in front of the center of the second housing 42 in the front-rear direction. In the present embodiment, the base end E1 of the groove 51 is located within a range from the front surface 42F to ¼ of the dimension in the front-rear direction of the second housing 42.

More specifically, the depth position D1 of the base end E1 of the groove 51 is desirably located far from the front surface 42F from the viewpoint of disposing the emergency stop button 56 away from the corner portion 42C, and is desirably located close to the emergency stop button 56, that is, the front surface 42F from the viewpoint of grasping the position of the emergency stop button 56 in a blind way.

As will be described later, in the configuration in which the emergency stop button 56 is disposed at a position D2 of from 200 mm to 300 mm from the front surface 42F, the depth position D1 of the base end E1 of the groove 51 is desirably set to a position of 400 mm or less from the front surface 42F. In the present embodiment, the depth position D1 of the base end E1 of the groove 51 is set to 300 mm from the front surface 42F.

In this regard, the terminal end E2 of the groove 51 is located in a portion of the front surface 42F on the left side surface 42S side. Specifically, the terminal end E2 of the groove 51 is an edge (that is, parting line 48S) on the front surface side of the corner portion 42C.

The height position H3 at the center of the groove 51 in the up-down direction with respect to the installation surface of the apparatus 10 is desirably from 800 mm to 1100 mm, and more desirably from 900 mm to 1050 mm, that is, a range separated from the upper surface by 50 mm or more. As described above, in the present embodiment in which the height H1 of the upper surface of the second body 40 is 1000 mm, a more desirable range is from 900 mm to 950 mm. In the present embodiment, the height position H3 at the center of the groove 51 in the up-down direction is 920 mm as an example (see also FIG. 2).

The vertical width H2 of the groove 51 is desirably from 80 mm to 180 mm, more desirably from 100 mm to 160 mm, and still more desirably 130 mm. In the present embodiment, the vertical width H2 of the groove 51 is 130 mm, for example.

In addition, the position of the terminal end E2 of the groove 51 is desirably a position of from 50 mm to 150 mm from the side surface 42S side, desirably a position of from 75 mm to 125 mm, and more desirably a position of 100 mm. In the present embodiment, the position of the terminal end E2 of the groove 51 is set to a position of 100 mm from the side surface 42S side. That is, the range W1 from the side surface 42S of the groove 51 is 100 mm.

In addition, the depth Y1 of the bottom surface of the groove 51 with respect to the general surface 46 is desirably from 1 mm to 10 mm, more desirably from 3 mm to 7 mm, and still more desirably 5 mm. In the present embodiment, the depth Y1 with respect to the general surface 46 is, for example, 5 mm.

The groove 51 further includes a first recess 52 and a second recess 54.

The first recess 52 is a circular recess having a larger diameter than the emergency stop button 56 described later in side view with respect to the bottom surface of the groove 51, and is formed between the base end E1 and the front surface 42F in side view.

The second recess 54 is a circular recess having a larger diameter than the reset button 58 described later and a smaller diameter than the first recess 52 in side view with respect to the bottom surface of the groove 51, and is formed side by side with the first recess 52 between the base end E1 and the first recess 52.

As an example, the first recess 52 and the second recess 54 are located at the center of the vertical width of the groove 51.

(Emergency Stop Button 56 and Reset Button 58)

The emergency stop button 56 is, for example, a push button having a pressing portion 56A in which a top portion of a substantially cylindrical shaft expands in the radial direction, and is pressed to stop the operation of the apparatus 10 in an emergency.

Note that, in the present description, "emergency stop" refers to an operation of artificially and suddenly stopping the operation of the apparatus 10 in order to reduce a risk or danger due to continuation of the operation of the apparatus 10.

When the pressing portion 56A is pressed, the emergency stop button 56 does not return to the original shape (that is, a state before being pressed) even if the hand is released from the pressing portion 56A of the emergency stop button 56, and maintains the pressed shape.

In addition, when the pressing portion 56A of the emergency stop button 56 is pressed, a function of preventing the operation of the apparatus 10, such as an interlock, is activated by a control unit (not illustrated), whereby the apparatus 10 is maintained in the emergency stop state.

As an example, when the operator M pinches the pressing portion 56A and rotates the pressing portion 56A in the designated direction, the emergency stop button 56 whose pressing portion 56A is pressed by the operator M returns to the shape before being pressed by the pressing portion 56A jumping out in the direction opposite to the pressing direction.

The emergency stop button 56 is accommodated in the first recess 52 by being disposed on a bottom surface of the first recess 52 formed on a bottom surface of the groove 51.

As illustrated in FIGS. 4A to 4C, the emergency stop button 56 protrudes from the bottom surface of the groove 51 when the side surface 42S is viewed from the front in the unpressed state (that is, a state in which the apparatus 10 is operating), and is substantially flush with the general surface 46.

The first recess 52 and the emergency stop button 56 are desirably disposed at the center of the groove 51 in the up-down direction. That is, in the present embodiment, as an example, the first recess 52 and the emergency stop button 56 are disposed at a position 1000 from the installation surface of the apparatus in accordance with the height position H3 at the center in the up-down direction of the groove 51 (see also FIG. 2).

The position D2 from the front surface 42F where the first recess 52 and the emergency stop button 56 are disposed is desirably from 120 mm to 250 mm, more desirably from 150 mm to 220 mm, and still more desirably from 170 mm to 200 mm. In the present embodiment, the position D2 from the front surface 42F where the first recess 52 and the emergency stop button 56 are disposed is, for example, a position 185 mm away from the front surface 42F.

An amount Y2 by which the emergency stop button 56 protrudes from the bottom surface of the groove 51 is desirably from 1 mm to 10 mm, more desirably from 3 mm to 7 mm, and still more desirably 5 mm. In the present embodiment, an amount Y2 by which the emergency stop button 56 protrudes from the bottom surface of the groove 51 is, for example, 3 mm. As a result, the emergency stop button 56 is pressed when the operator M hits an appropriate position on the bottom surface of the groove 51 with the palm.

In the emergency stop button 56, the pressing portion 56A protrudes in the pressing direction from the bottom surface of the first recess 52 in the pressed state, and the outer periphery of the pressing portion 56A is surrounded by the recessed wall (in other words, the inner peripheral surface) of the first recess 52. In a side view of the side surface 42S, the gap G1 between the edge of the first recess 52 and the emergency stop button 56 is not particularly limited as long as the operator M can pinch the pressing portion 56A of the emergency stop button 56 and rotate in the designated direction. For example, the gap G1 is set to 20 mm.

The reset button 58 is, for example, a cylindrical push button, and is pressed to return the state of the apparatus 10 stopped by the emergency stop button 56.

More specifically, after the pressing portion 56A of the emergency stop button 56 is pressed and the apparatus 10 is brought into an emergency stop, the reset button 58 is pressed in a state where the pressing portion 56A is returned to the shape before being pressed, so that the above-described function of preventing the operation of the apparatus 10 is released and the apparatus 10 is brought into an operable state.

Here, the operable state refers to a state in which the image forming processing can be performed on the recording medium P by the apparatus 10 by the will of the operator M who operates the apparatus 10, and the image forming processing is not prevented from being performed.

The reset button 58 is disposed on the bottom surface of the second recess 54 formed on the bottom surface of the groove 51, and is accommodated in the second recess 54 in a state where the periphery of the pressing portion 58A is surrounded by the second recess 54.

That is, the reset button 58 has a shape that is pressed when an operator butts a finger within a range of the pressing portion 58A of the reset button 58 when the apparatus 10 is viewed from the side.

The pressing portion 58A of the reset button 58 is recessed with respect to the bottom surface of the groove 51 in a state where it is not pressed by the operator M. The pressing portion 58A of the reset button 58 is recessed with respect to the bottom surface of the second recess 54 in the unpressed state. Accordingly, even when the operator M hits the bottom surface of the groove 51 with his/her palm, the reset button 58 is not pressed. The pressing portion 58A of the reset button 58 may be recessed with respect to the protruding end surface of the cylindrical boss protruding from the bottom surface of the second recess 54.

In the disclosure, in the reset button 58, the gap G2 between the edge of the second recess 54 and the reset button 58 is preferably narrower than the gap G1 between the edge of the first recess 52 and the emergency stop button 56 described above.

In other words, it is desirable that the reset button 58 has a shape that prevents the operator M from touching the pressing portion 58A of the reset button 58 from a direction other than the direction opposite to the pressing direction.

As an example, in a side view of the side surface 42S, the gap G2 between the edge of the second recess 54 and the reset button 58 is set to 5 mm or less.

(Movement of Operator M)

Next, a state in which the operator M performs work using the apparatus 10 according to the disclosure will be described.

The operator M operates the display operation unit 82 from the front of the apparatus 10 with the display operation unit 82 facing the frontward direction of the second body 40.

By this operation, the operator M inputs setting values of the image forming processing performed by the first body 20, such as image data to be formed on the recording medium P and a sheet to be used, and forms an image on the recording medium P.

In this manner, the operator M forms an image while checking the screen of the display operation unit 82 while being positioned in front of the second body 40.

Next, the operator M moves to the left of the second body 40 and checks the recording medium P discharged to the top tray 62 in a state where the display operation unit 82 is directed to the left of the second body 40.

The operator M places the recording medium P discharged onto the top tray 62 side by side on the side table 64, and compares the recording medium P placed on the side table 64 and the recording medium P discharged onto the top tray 62 side by side.

As described above, the operator M moves forward and leftward of the second body 40 to perform different works in a series of movements.

(Emergency Stop Operation)

Here, the operator M presses the emergency stop button 56 to stop the apparatus 10 in an emergency when the operator M recognizes that the apparatus 10 needs to be urgently stopped, for example, when the recording medium P is clogged in the apparatus 10 or when an abnormality occurs in the apparatus 10 in a state where the apparatus 10 is operating.

Figure 5:
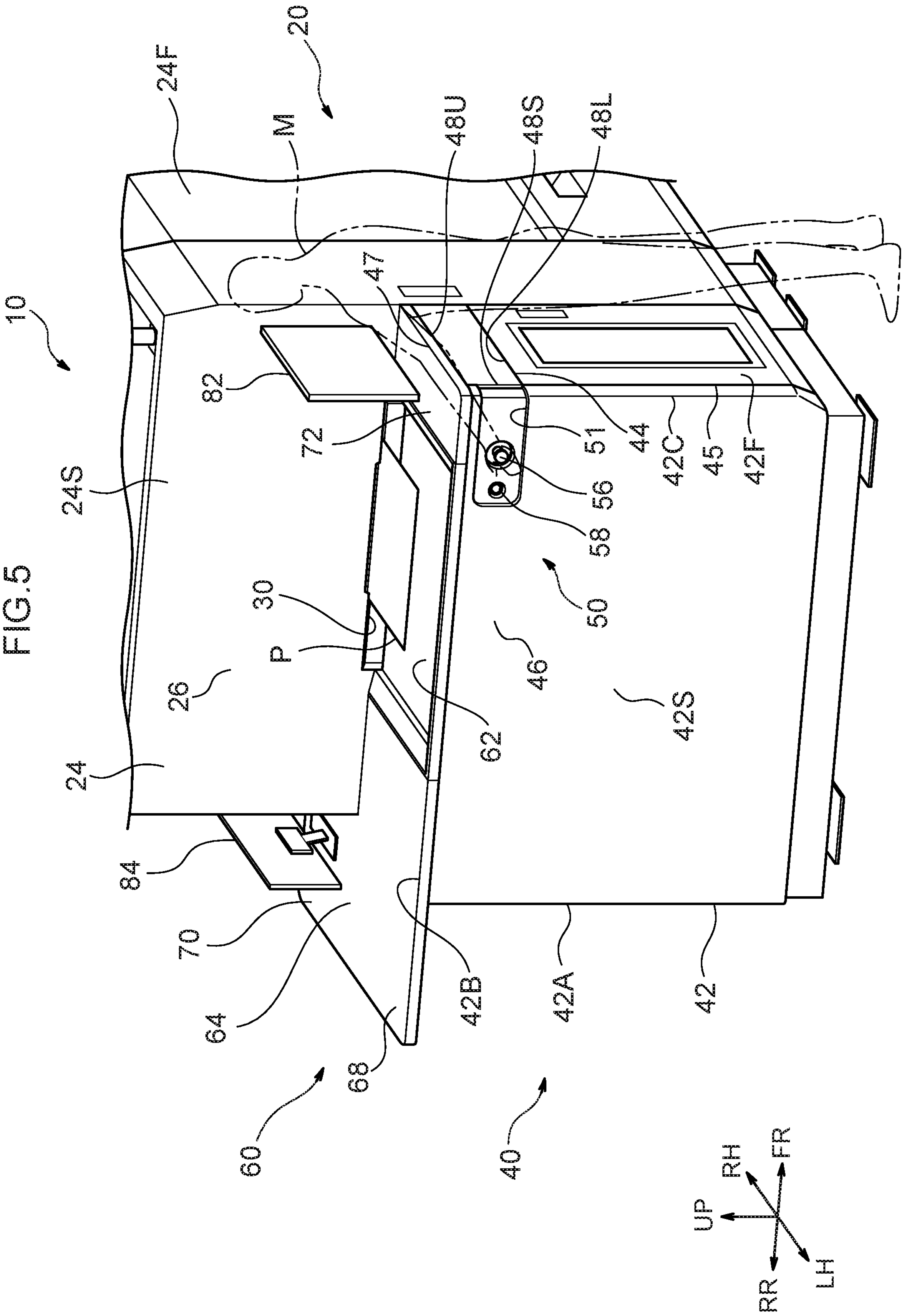
FIG. 5 is a perspective view illustrating a state in which an emergency stop operation is performed on the apparatus according to the embodiment of the disclosure from a front surface.
Figure 6:
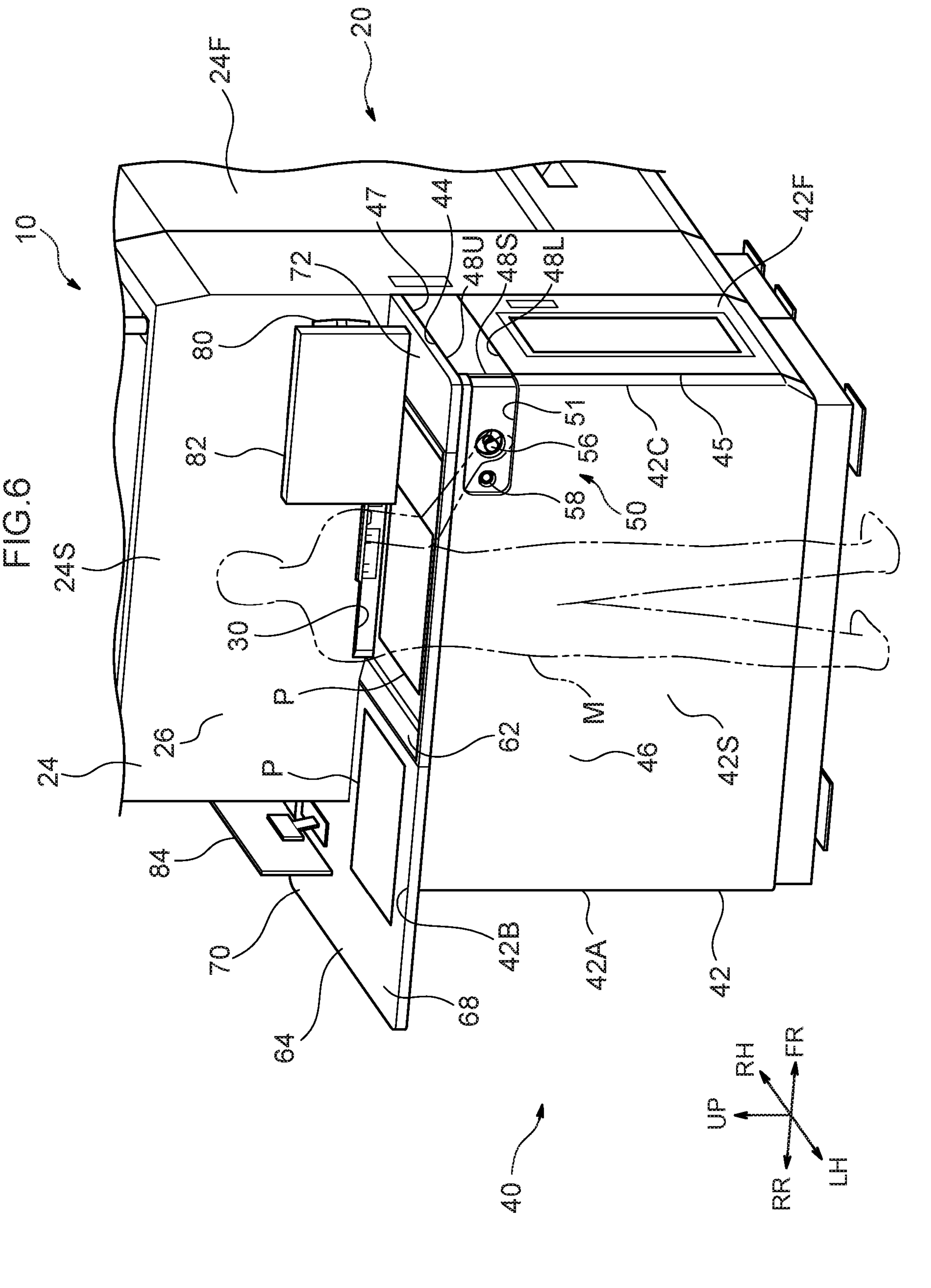
FIG. 6 is a perspective view illustrating a state in which an emergency stop operation is performed on the apparatus according to the embodiment of the disclosure from a side surface.

FIGS. 5 and 6 are diagrams illustrating a state in which the operator M presses the emergency stop button 56 and performs an emergency stop operation in the apparatus 10 according to the disclosure.

For example, as illustrated in FIG. 5, when the operator M is operating work in front of the second body 40, the operator M presses the emergency stop button 56 disposed on the side surface 42S of the second body 40.

In this case, the operator M presses the emergency stop button 56 disposed on the side surface 42S while grasping the position by probing the groove 51 formed on the side surface 42S without visually recognizing the side surface 42S and the emergency stop button 56.

For example, as illustrated in FIG. 6, when the operator M is operating work on the left side of the second body 40, the operator M presses the emergency stop button 56 disposed on the side surface 42S of the second body 40.

In this case, the operator M presses the emergency stop button 56 while grasping the position by probing the groove 51 formed in the side surface 42S without visually recognizing the side surface 42S and the emergency stop button 56.

In this manner, the operator M grasps the position of the emergency stop button 56 in a blind way without visually recognizing the emergency stop button arranged on the bottom surface of the groove 51, and presses the emergency stop button 56 to urgently stop the apparatus 10.

After performing the emergency stop operation, the operator M removes the reason why the apparatus 10 should be urgently stopped.

The operator M removes the reason why the apparatus 10 should be urgently stopped, returns the emergency stop button 56 to the original state (that is, the state before the emergency stop operation), and then presses the reset button 58 to return the stopped apparatus 10 to the operable state.

(Effects)

In the apparatus 10 according to the disclosure, the following effects can be obtained.

In the apparatus 10 according to the disclosure, the emergency stop button 56 is disposed at a bottom of the groove 51 formed in the side surface 42S of the second housing 42.

Therefore, as compared with the case in which the push button is disposed at the corner portion 42C of the apparatus, when the operator M moves, it is possible to prevent the operator M from accidentally touching the corner portion 42C and erroneously operating the push button.

Since the emergency stop button 56 is disposed at the bottom of the groove 51 formed in the side surface 42S of the second housing 42, the emergency stop button 56 is provided at a position recessed with respect to the general surface 46.

As a result, as compared with a case in which the band-shaped portion is not the groove 51 but the side surface 42S and the front surface 42F are flush with each other, it is possible to suppress the operator M from unexpectedly touching the emergency stop button 56 and performing an erroneous operation when moving forward and leftward of the second body 40.

In addition, since the groove 51 is formed to extend from the side surface 42S of the second body 40 to the front surface 42F of the second body 40, the groove 51 can be visually recognized from the front of the apparatus 10.

As a result, the operator M can recall the position of the emergency stop button 56 because the operator M visually recognizes the groove 51 when the apparatus 10 is viewed from the front.

In addition, since the groove 51 is formed in the portion of the front surface 42F of the second body 40 on the side surface 42S side, it is suppressed that the operator M erroneously recognizes that the groove 51 is a design formed in the second body 40.

As a result, it is possible to suppress an erroneous operation of the emergency stop button 56 as compared with the case in which the terminal end E2 of the groove 51 reaches the right side of the front surface 42F.

In the groove 51, on the front surface 42F of the second housing 42, the upper end 51U of the groove 51 abuts on the parting line 48S of the fixed cover 44, and the lower end 51L of the groove 51 is connected to the parting line 48L of the fixed cover 44.

As a result, as compared with the case in which the upper end 51U and the lower end 51L of the groove 51 are respectively connected to the parting lines 48U and 48L in the front surface 42F of the second body 40, the groove 51 is prevented from being erroneously recognized as the design of the second body 40 by the operator M, and the erroneous operation of the emergency stop button 56 can be prevented.

The groove 51 is formed only on the front surface 42F side from the base end E1 disposed on the front surface 42F side with respect to the center of the side surface 42S when the second body 40 is viewed from the side.

As a result, as compared with the case in which the base end of the groove 51 reaches the back surface side of the side surface 42S, when the operator M views the apparatus 10 sideways, it is easy for the operator M to recall the position of the push button disposed at the bottom of the groove 51, and it is possible to suppress erroneous operation of the emergency stop button 56.

The emergency stop button 56 is pressed to stop the apparatus 10.

As a result, it is possible to suppress an erroneous operation of the emergency stop button 56 as compared with the case in which the emergency stop button 56 is disposed at the corner portion 42C of the apparatus 10.

Since the emergency stop button 56 is disposed closer to the front surface 42F of the second body 40 than the reset button 58, the operator M in front of the second body 40 can more easily touch the emergency stop button 56.

As a result, as compared with the case in which the emergency stop button 56 is disposed closer to the back surface side of the second body 40 than the reset button 58, even when the operator M is positioned in front of the apparatus 10 at the time of the emergency stop operation, the operator M is prevented from erroneously operating the reset button 58.

Further, since the reset button 58 is disposed so as not to protrude from the bottom surface of the groove 51, the operator M is less likely to touch than the emergency stop button 56.

As a result, as compared with the case in which the reset button 58 protrudes from the groove 51 in the pressing direction, the operator M is prevented from erroneously operating the reset button 58 during the emergency stop operation.

In addition, since the gap G2 between the second recess 54 and the edge and the reset button 58 is formed narrower than the gap G1 between the edge of the first recess 52 and the emergency stop button 56, the operator M cannot touch the reset button from a direction other than the direction opposite to the pressing direction. Therefore, the operator M is less likely to touch the reset button 58 than the emergency stop button 56.

As a result, as compared with a case in which the gap G2 between the second recess 54, the edge, and the reset button 58 is larger than the gap G1 between the edge of the first recess 52 and the emergency stop button 56, it is possible to prevent the operator M from erroneously recognizing the reset button 58 and the emergency stop button 56 and performing an erroneous operation during the emergency stop operation.

In addition, since the reset button 58 is arranged side by side with the emergency stop button 56, the position of the reset button 58 can be recognized by the operator M.

Accordingly, at the time of emergency stop operation, after the operator M presses the emergency stop button 56 to stop the apparatus 10, the apparatus 10 can be made operable again.

Since the emergency stop button 56 is provided within a range of from 200 mm to 300 mm from the front surface 42F of the second body 40, the operator M can easily press the emergency stop button 56 even when the operator M is in front of the apparatus 10.

As a result, the operator M can easily operate the emergency stop button 56 disposed on the bottom surface of the groove 51 as compared with the apparatus in which the position of the emergency stop button 56 is out of the above range, and can suppress the erroneous operation of the emergency stop button 56.

Since the emergency stop button 56 is away from the corner portion 42C of the second body 40, it is possible to prevent the operator M from colliding with the corner portion 42C when moving leftward and forward of the second body 40 and accidentally touching the emergency stop button 56 to perform an erroneous operation.

In addition, since the vertical width H2 of the groove 51 is formed to be from 100 mm to 200 mm, the shape is not too large and not too small with respect to the size of the palm of the operator M.

As a result, as compared with a case in which the vertical width H2 of the groove 51 is out of the range of from 100 mm to 200 mm, the operator M can recognize the position of the emergency stop button 56 provided at the bottom of the groove 51 in a blind way even without visually recognizing the groove 51, can easily operate the emergency stop button 56, and can suppress an erroneous operation of the emergency stop button 56.

In addition, the height H3 of the center of the groove 51 in the up-down direction is formed in a range of from 0.8 m to 1.1 m with respect to the installation surface of the apparatus 10, and thus is formed in a range of a height that can be easily reached by the hand of the operator M.

As a result, the operator M can easily operate the emergency stop button 56 arranged on the bottom surface of the groove 51 as compared with the apparatus in which the position of the groove 51 is out of the above range, and can suppress the erroneous operation of the emergency stop button 56.

Further, since the width of the groove 51 from the base end E1 to the front surface is 400 mm or less, the groove is formed in a range where the operator M can reach the base end E1 from the front surface 42F side.

As a result, the emergency stop button 56 disposed on the bottom surface of the groove 51 can be easily operated as compared with the apparatus in which the position of the base end E1 is out of the above range, and the erroneous operation of the emergency stop button 56 can be suppressed.

In addition, since the upper portion of the second body 40 serves as the working portion 60 of the operator M, the operator M can compare the recording medium P discharged from the discharge port 30 side by side on the upper portion of the second body 40 and check the finished state.

As a result, as compared with a case in which the upper portion of the second body 40 is not used as the working portion 60 of the operator M, it is possible to suppress the erroneous operation of the emergency stop button 56 while improving the efficiency of the work of the operator M forming an image on the recording medium P using the apparatus 10.

In addition, since the groove 51 is arranged to be shifted forward with respect to the top tray 62, it is difficult for the operator M to unexpectedly touch the emergency stop button 56 during the work of confirming the recording medium P placed on the top tray 62.

As a result, as compared with the case in which the emergency stop button 56 is disposed at the corner portion 42C of the second body 40, it is possible to prevent the operator M from unexpectedly touching the emergency stop button 56 and performing an erroneous operation during the operation in which the operator M checks the recording medium P placed on the top tray 62.

When the emergency stop button 56 and the reset button 58 are disposed on the front surface 42F of the second housing 42, the emergency stop button 56 and the reset button 58 are difficult to reach in a state where the fixed cover 44 and the opening/closing cover 45 disposed on the front surface 42F of the second housing 42 are opened.

However, in the apparatus 10 according to the present embodiment, since the emergency stop button 56 and the reset button 58 are disposed on the side surface 42S of the second housing 42, it is easy to reach even in a state where the fixed cover 44 and the opening/closing cover 45 disposed on the front surface 42F of the second housing 42 are opened.

As a result, as compared with the case in which the emergency stop button 56 and the reset button 58 are disposed on the front surface 42F of the second body 40, the operator M can easily operate the emergency stop button 56 even in a state where the fixed cover 44 and the opening/closing cover 45 are opened.

(Modification of Band-Shaped Portion)

Note that, in the above description, the band-shaped portion formed in the apparatus 10 according to the disclosure is the groove 51, but the band-shaped portion in the apparatus according to the disclosure is not limited thereto.

As described above, if the band-shaped portion is a band-shaped portion that can be visually and tactilely distinguished from a portion outside the band-shaped portion by the operator M on the surface of the housing, the boundaries of the base end E1, the terminal end E2, the upper end 51U, and the lower end 51L can be formed by various methods.

For example, the band-shaped portion may be a portion protruding from the side surface 42S and the front surface 42F instead of the groove 51.

Furthermore, for example, the band-shaped portion may be a region divided by providing a portion having a partition wall protruding in a frame shape from the general surface 46 or a frame-like groove as an edge at positions of the base end E1, the terminal end E2, the upper end 51U, and the lower end 51L instead of the groove 51.

In addition, as long as the upper end 51U and the lower end 51L are formed, the base end E1 and the terminal end E2 are not actually formed, and the band-shaped portion may be a region divided by a virtual boundary connecting both ends of the upper end 51U and the lower end 51L.

For example, the band-shaped portion may be provided with a portion having a partition wall protruding in a frame shape from the general surface 46 or a frame-like groove as an edge at positions of the upper end 51U and the lower end 51L instead of the groove 51, and may be a region in which virtual boundaries connecting both ends of the upper end 51U and the lower end 51L are partitioned as the base end E1 and the terminal end E2, respectively.

Note that the portion having the partition wall or the frame-shaped groove protruding in a frame shape from the general surface 46 as an edge may not be continuously provided, and may be formed by arranging protrusions or recesses in a row, for example.

As described above, if the band-shaped portion is a region that can be visually and tactilely distinguished from other parts, the operator M can recognize the position of the emergency stop button 56 by visually recognizing the band-shaped portion or by probing the band-shaped portion. Therefore, it is possible to prevent the operator M from erroneously operating the emergency stop button 56.

In addition, by forming the band-shaped portion on the surface of the housing so that the operator M can visually distinguish the band-shaped portion from the portion outside the band-shaped portion, the boundaries of the base end E1, the terminal end E2, the upper end 51U, and the lower end 51L may be formed by various methods.

For example, the band-shaped portion may be a portion having a color difference between the side surface 42S and the front surface 42F instead of the groove 51.

In addition, for example, the band-shaped portion may be a region divided by portions having different colors in a frame shape at positions of the base end E1, the terminal end E2, the upper end 51U, and the lower end 51L instead of the groove 51.

For example, the band-shaped portion may be provided with a portion having a different color from the general surface 46 in a frame shape at the position of the upper end 51U and the lower end 51L instead of the groove 51, and may be a region in which virtual boundaries connecting both ends of the upper end 51U and the lower end 51L are partitioned as the base end E1 and the terminal end E2, respectively.

As described above, if the band-shaped portion is a portion that can be visually distinguished from other parts, the operator M can recognize the position of the emergency stop button 56 by visually recognizing the band-shaped portion, and thus, it is possible to suppress the operator M from erroneously operating the emergency stop button 56.

Other Modifications

In the above description, the pressing portion 56A of the emergency stop button 56 protrudes from the bottom of the groove 51 and is disposed to be recessed with respect to the general surface 46. However, the present invention is not limited thereto, and the pressing portion may protrude with respect to the general surface 46.

As a result, the operator M can easily press the pressing portion 56A of the emergency stop button 56. However, in this case, as compared with the configuration of the above-described embodiment, when the operator M goes around from the side surface of the apparatus 10 to the front surface, the operator M can easily accidentally touch the emergency stop button 56 and perform an erroneous operation.

In the above description, the emergency stop button 56 is used as an example of the push button, but instead of this, a button to which a function other than the emergency stop is assigned may be arranged.

Furthermore, in the above description, the reset button 58 is used as an example of another push button, but instead of this, a button to which a function other than the function of returning the apparatus 10 to the operable state is allocated may be arranged.

The operator M may input data to the display operation unit 82 by using an input apparatus such as a keyboard or a mouse disposed on the front table 72 instead of operating the touch panel. Furthermore, the display operation unit 82 may be fixed to a housing.

In the above description, the display operation unit 82 faces the frontward direction, the leftward direction, and the rearward direction. However, in order to make the display operation unit 82 easily viewable according to the height of the operator M, the angle at which the display operation unit 82 faces may be changed by further rotating the display operation unit about the horizontal direction.

In the above description, the base end E1 of the groove 51 is disposed on the front surface 42F side of the side surface 42S, but the present invention is not limited thereto. That is, the position of the base end E1 may be any length as long as the operator M can reach the base end E1 when the operator M stands on the front surface of the apparatus 10.

For example, in a case in which the length of the apparatus 10 in the depth direction is shorter than twice the range that the operator M can reach when standing on the front surface of the apparatus 10, the base end E1 is formed on the depth direction side of the center of the side surface 42S. In this case, the same effect as that of the above-described embodiment can be obtained.

Furthermore, in the above description, the apparatus 10 is an image forming apparatus that forms an image by an inkjet method, but the apparatus 10 according to the disclosure is not limited thereto, and can be used for an electrophotographic image forming apparatus or a printing machine.

Furthermore, in the above description, the apparatus 10 including the image forming apparatus has been described, but the apparatus 10 according to the disclosure is not limited thereto. The discharge object targeted by the apparatus 10 according to the disclosure can be variously applied to foods, machine parts, and the like in addition to the recording medium P.

For example, if the apparatus 10 is a 3D printer, a three-dimensional object is considered as an example of the discharge object, if the apparatus 10 is a folding apparatus, folded paper is considered as an example of the discharge object, and if the apparatus 10 is a bookbinding apparatus, a booklet is considered as an example of the discharge object.

Furthermore, the technology according to the disclosure is similarly applied to an apparatus such as a cutting machine, for example, in addition to the apparatus 10 in which the discharge object is discharged from the discharge port 30 as described above.

Although the embodiments of the disclosure have been described above with reference to the accompanying drawings, it is obvious that a person having ordinary knowledge in the technical field to which the disclosure belongs can conceive various modifications or applications within the scope of the technical idea described in the claims, and it is naturally understood that these also belong to the technical scope of the disclosure.

The disclosure of Japanese Patent Application No. 2021-137571 filed on Aug. 25, 2021 is incorporated herein by reference in its entirety.

All documents, patent applications, and technical standards described in this specification are incorporated herein by reference to the same extent as if each individual document, patent application, and technical standard were specifically and individually indicated to be incorporated by reference.

The invention claimed is:

1. An apparatus comprising:

a housing in which a band-shaped portion extending over a side surface and a front surface of the apparatus is formed; and a push button disposed within a range of the band-shaped portion on the side surface, the push button protruding in a pressing direction from the band-shaped portion, wherein:

the band-shaped portion has a terminal end at a portion on a side surface side of the front surface, and one edge among upper and lower edges of the terminal end of the band-shaped portion extends horizontally on the front surface and is connected to a boundary line, which is a boundary between a plurality of surfaces, and another edge of the upper and lower edges of the terminal end of the band-shaped portion abuts on another boundary line, which is a boundary between a plurality of surfaces and extends vertically on the front surface.

2. The apparatus according to claim 1, wherein the band-shaped portion is a groove recessed with respect to the side surface and the front surface of the housing, and the push button protrudes from a bottom of the groove in the pressing direction.

3. The apparatus according to claim 1, wherein the band-shaped portion has a base end at a portion on a front surface side of the side surface.

4. The apparatus according to claim 1, wherein the push button is a stop button that is pressed to stop the apparatus.

5. The apparatus according to claim 4, further comprising:

another push button that has a function different from the stop button and is disposed within a range of the band-shaped portion, wherein the stop button is disposed closer to the front surface than the other push button.

6. The apparatus according to claim 5, wherein the other push button is disposed to be recessed in a pressing direction with respect to the band-shaped portion.

7. The apparatus according to claim 5, wherein the other push button is a reset button that is pressed to return the apparatus stopped by the stop button to an operable state.

8. The apparatus according to claim 4, wherein the stop button is within a range of from 120 mm to 250 mm from the front surface.

9. The apparatus according to claim 1, wherein a vertical width of the band-shaped portion is from 80 mm to 180 mm.

10. The apparatus according to claim 1, wherein a vertical center of the band-shaped portion has a height of from 800 mm to 1100 mm from an installation surface of the apparatus.

11. The apparatus according to claim 1, wherein a base end of the band-shaped portion is within a range of 400 mm or less from the front surface.

12. The apparatus according to claim 1, wherein the housing has an upper surface connected to the side surface and the front surface, and the upper surface constitutes a working portion of an operator.

13. An apparatus comprising:

a housing in which a band-shaped portion extending over a side surface and a front surface of the apparatus is formed;

a push button disposed within a range of the band-shaped portion on the side surface, the push button protruding in a pressing direction from the band-shaped portion, wherein the push button is a stop button that is pressed to stop the apparatus;

another push button that has a function different from the stop button and is disposed within a range of the band-shaped portion, wherein the stop button is disposed closer to the front surface than the other push button;

a first recess that is provided in the band-shaped portion and in which the stop button is accommodated; and a second recess provided in the band-shaped portion, the second recess accommodating the other push button, and having a gap between an edge and the other button, the gap being smaller than a gap between the stop button and an edge of the first recess.

14. An apparatus comprising:

a housing in which a band-shaped portion extending over a side surface and a front surface of the apparatus is formed, wherein the housing has an upper surface connected to the side surface and the front surface, and the upper surface constitutes a working portion of an operator; and a push button disposed within a range of the band-shaped portion on the side surface, the push button protruding in a pressing direction from the band-shaped portion, wherein a discharge portion through which a discharge object is discharged from another housing disposed adjacent to the housing is provided above the upper surface, the discharge portion is accessible from the side surface, and the band-shaped portion is disposed to be shifted toward the front surface with respect to the discharge portion in a side view.

15. The apparatus according to claim 14, wherein:

the other housing includes a forming unit that forms an image on a recording medium, and the discharge portion discharges a medium on which an image is formed in the other housing.

* * * * *